(12) United States Patent
Waldspurger et al.

(10) Patent No.: US 9,477,603 B2
(45) Date of Patent: Oct. 25, 2016

(54) SYSTEM AND METHOD FOR PARTITIONING OF MEMORY UNITS INTO NON-CONFLICTING SETS

(71) Applicant: Facebook, Inc., Menlo Park, CA (US)

(72) Inventors: Carl A. Waldspurger, Palo Alto, CA (US); Oded Horovitz, Palo Alto, CA (US); Stephen A. Weis, San Francisco, CA (US); Sahil Rihan, Menlo Park, CA (US)

(73) Assignee: FACEBOOK, INC., Menlo Park, CA (US)

( * ) Notice: Subject to any disclaimer, the term of this patent is extended or adjusted under 35 U.S.C. 154(b) by 235 days.

(21) Appl. No.: 14/479,239

(22) Filed: Sep. 5, 2014

(65) Prior Publication Data

US 2015/0067265 A1    Mar. 5, 2015

Related U.S. Application Data

(60) Provisional application No. 61/874,350, filed on Sep. 5, 2013.

(51) Int. Cl.
*G06F 12/08* (2016.01)
*G06F 12/12* (2016.01)

(52) U.S. Cl.
CPC ....... *G06F 12/0862* (2013.01); *G06F 12/0868* (2013.01); *G06F 12/126* (2013.01)

(58) Field of Classification Search
None
See application file for complete search history.

(56) References Cited

U.S. PATENT DOCUMENTS

| | | | |
|---|---|---|---|
| 5,875,472 A * | 2/1999 | Bauman | G06F 12/0815 711/141 |
| 6,223,256 B1 * | 4/2001 | Gaither | G06F 12/126 711/118 |
| 6,389,442 B1 | 5/2002 | Yin et al. | |
| 6,697,927 B2 | 2/2004 | Bonola et al. | |
| 6,970,960 B1 | 11/2005 | Sarfati et al. | |
| 7,266,661 B2 * | 9/2007 | Walmsley | G06F 21/75 711/154 |
| 7,434,000 B1 * | 10/2008 | Barreh | G06F 12/0859 711/118 |
| 7,577,851 B2 | 8/2009 | Inamura et al. | |
| 7,657,756 B2 | 2/2010 | Hall et al. | |

(Continued)

OTHER PUBLICATIONS

Zhiyuan Li. "Reducing Cache Conflicts by Partitioning and Privatizing shared arrays". 1999. Parallel Architectures and Compilation Techniques, 1999. Proceedings. 1999 International Conference on 1999. 8 pages (pp. 183-190).*

(Continued)

*Primary Examiner* — Charles Rones
*Assistant Examiner* — Matthew Chrzanowski
(74) *Attorney, Agent, or Firm* — Perkins Coie LLP

(57) ABSTRACT

A system and method of operation exploit the limited associativity of a single cache set to force observable cache evictions and discover conflicts. Loads are issued to input memory addresses, one at a time, until a cache eviction is detected. After observing a cache eviction on a load from an address, that address is added to a data structure representing the current conflict set. The cache is then flushed, and loads are issued to all addresses in the current conflict set, so that all known conflicting addresses are accessed first, ensuring that the next cache miss will occur on a different conflicting address. The process is repeated, issuing loads from all input memory addresses, incrementally finding conflicting addresses, one by one. Memory addresses that conflict in the cache belong to the same partition, whereas memory addresses belonging to different partitions do not conflict.

27 Claims, 2 Drawing Sheets

(56) References Cited

U.S. PATENT DOCUMENTS

| | | | |
|---|---|---|---|
| 7,671,864 B2 | 3/2010 | Román et al. | |
| 7,774,622 B2 | 8/2010 | Mitra et al. | |
| 8,037,250 B1* | 10/2011 | Barreh | G06F 12/0842 711/125 |
| 8,135,962 B2 | 3/2012 | Strongin et al. | |
| 8,352,718 B1 | 1/2013 | Rao et al. | |
| 8,615,665 B2 | 12/2013 | Fitton et al. | |
| 8,726,364 B2 | 5/2014 | Smith et al. | |
| 8,738,932 B2 | 5/2014 | Lee et al. | |
| 8,782,433 B2 | 7/2014 | Kaabouch et al. | |
| 8,812,796 B2* | 8/2014 | Gray | G06F 12/0831 711/118 |
| 8,886,959 B2 | 11/2014 | Tamiya et al. | |
| 8,904,477 B2 | 12/2014 | Walker et al. | |
| 8,924,743 B2 | 12/2014 | Wolfe et al. | |
| 8,949,797 B2 | 2/2015 | Christodorescu et al. | |
| 9,164,924 B2 | 10/2015 | Horowitz et al. | |
| 2002/0004860 A1 | 1/2002 | Roman et al. | |
| 2002/0116595 A1* | 8/2002 | Morton | G06F 8/45 712/22 |
| 2002/0138700 A1* | 9/2002 | Holmberg | G06F 9/3802 711/137 |
| 2003/0033480 A1* | 2/2003 | Jeremiassen | G06F 8/4442 711/118 |
| 2003/0065892 A1 | 4/2003 | Bonola et al. | |
| 2003/0188178 A1* | 10/2003 | Strongin | G06F 12/1408 713/193 |
| 2003/0236947 A1* | 12/2003 | Yamazaki | G06F 12/084 711/128 |
| 2004/0111639 A1 | 6/2004 | Schwartz et al. | |
| 2006/0020941 A1 | 1/2006 | Inamura et al. | |
| 2006/0080553 A1 | 4/2006 | Hall et al. | |
| 2007/0239938 A1* | 10/2007 | Pong | G06F 12/0846 711/122 |
| 2008/0010413 A1* | 1/2008 | Kailas | G06F 9/30043 711/129 |
| 2008/0022160 A1 | 1/2008 | Chakraborty et al. | |
| 2008/0109660 A1 | 5/2008 | Mitra et al. | |
| 2009/0328195 A1 | 12/2009 | Smith et al. | |
| 2010/0005300 A1 | 1/2010 | Klotsche et al. | |
| 2010/0064144 A1 | 3/2010 | Kaabouch et al. | |
| 2010/0115620 A1 | 5/2010 | Alme et al. | |
| 2010/0281273 A1 | 11/2010 | Lee et al. | |
| 2010/0287385 A1 | 11/2010 | Conte et al. | |
| 2011/0022818 A1 | 1/2011 | Kegel et al. | |
| 2011/0047362 A1* | 2/2011 | Eichenberger | G06F 9/3851 712/226 |
| 2011/0167278 A1 | 7/2011 | Goto et al. | |
| 2011/0258610 A1 | 10/2011 | Aaraj et al. | |
| 2011/0314468 A1 | 12/2011 | Zhou et al. | |
| 2012/0124296 A1* | 5/2012 | Bryant | G06F 9/3861 711/136 |
| 2013/0067245 A1* | 3/2013 | Horovitz | G06F 12/0888 713/193 |
| 2013/0263121 A1* | 10/2013 | Franke | G06F 9/45537 718/1 |
| 2014/0108649 A1 | 4/2014 | Barton et al. | |
| 2014/0201452 A1* | 7/2014 | Meredith | G06F 12/128 711/130 |
| 2015/0089152 A1* | 3/2015 | Busaba | G06F 12/0831 711/141 |
| 2015/0089153 A1* | 3/2015 | Busaba | G06F 12/0815 711/141 |
| 2015/0089154 A1* | 3/2015 | Busaba | G06F 12/0831 711/141 |
| 2015/0089155 A1* | 3/2015 | Busaba | G06F 12/0815 711/141 |
| 2015/0089159 A1* | 3/2015 | Busaba | G06F 12/0817 711/144 |
| 2015/0089502 A1 | 3/2015 | Weis et al. | |
| 2015/0227744 A1 | 8/2015 | Horowitz et al. | |
| 2015/0269091 A1* | 9/2015 | Horovitz | G06F 21/79 711/145 |
| 2015/0378731 A1* | 12/2015 | Lai | G06F 9/30174 712/30 |

OTHER PUBLICATIONS

Abhishek Rajimwale et al. "Coerced Cache Eviction and Discreet mode Journaling: Dealing with Misbehaving disks." Jun. 27-30, 2011. 2011 IEEE/IFIP 41st International Conference on Dependable Systems & Networks (DSN). pp. 518-529.*

Peter Deayton et al. "Set Utilization Based Dynamic Shared Cache Paritioning" Dec. 7-9, 2011. Parallel and Distributed Systems (ICPADS), 2011 IEEE 17th International Conference. pp. 284-291.*

"Intel 64 and IA-32 Architectures Software Developers Manual, vol. 3 (3A, 3B & 3C): System Programming Guide," Intel Corporation, Dec. 2015, pp. 1-1698. [Part 1], 233pages.

"Intel 64 and IA-32 Architectures Software Developers Manual, vol. 3 (3A, 3B & 3C): System Programming Guide," Intel Corporation, Dec. 2015, pp. 1-1698. [Part 2], 233pages.

"Intel 64 and IA-32 Architectures Software Developers Manual, vol. 3 (3A, 3B & 3C): System Programming Guide," Intel Corporation, Dec. 2015, pp. 1-1698. [Part 3], 230 pages.

"Intel 64 and IA-32 Architectures Software Developers Manual, vol. 3 (3A, 3B & 3C): System Programming Guide," Intel Corporation, Dec. 2015, pp. 1-1698. [Part 4], 166pages.

"Intel 64 and IA-32 Architectures Software Developers Manual, vol. 3 (3A, 3B & 3C): System Programming Guide," Intel Corporation, Dec. 2015, pp. 1-1698. [Part 5], 160pages.

"Intel 64 and IA-32 Architectures Software Developers Manual, vol. 3 (3A, 3B & 3C): System Programming Guide," Intel Corporation, Dec. 2015, pp. 1-1698. [Part 6], 338pages.

"Intel 64 and IA-32 Architectures Software Developers Manual, vol. 3 (3A, 3B & 3C): System Programming Guide," Intel Corporation, Dec. 2015, pp. 1-1698. [Part 7], 338pages.

Trusted Computing Group, [retrieved on Nov. 12, 2015], Retrieved from the internet: <http://www.trustedcomputinggroup.org>, 2015, 1 page.

Cache management via p. coloring, Wikipedia, [retrieved on Nov. 12, 2015], Retrieved from the Internet: <http://en.Wikipedia.org/wiki/cache_coloring>, Nov. 6, 2015, 2 pages.

Hardware security module, Wikipedia, [retrieved on Nov. 12, 2015], Retrieved from the Internet: <http://en.wikipedia.org/wiki/hardware_security_module>, Oct. 21, 2015, 5 pages.

Intel® Trusted Execution Technology (Intel® TXT), Software Development Guide, Measured Launch Environment Developer's Guide, Revision 012, Document: 315168-012, [retrieved on Nov. 12, 2015], Retrieved from the internet: <http://download.Intel.com/technology/security/downloads/315168.pdf>, Jul. 2015, pp. 1-169.

Anati Mai, et al., "Innovative Technology for CPU Based Attestation and Sealing", Proceedings of the Second International Workshop on Hardware and Architectural Support for Security and Privacy (HASP '13), Jun. 2013, pp. 1-7.

Baumann, A., et al., "Shielding Applications from an Untrusted Cloud wth Haven," Proceedings of the 11th USENIX Symposium on Operating Systems Design and Implementation, Oct. 6-8, 2014, pp. 267-283.

Bellard, F., "QEMU, a fast and portable dynamic translator", Proceedings of the USE NIX 2005 Annual Technical Conference, FREEN/X Track, Apr. 2005, pp. 41-46.

Bochs, "The Cross-Platform IA-32 Emulator" [retrieved on Aug. 26, 2015] Retrieved from the Internet: <http://bochs.sourceforge.net/>, May 3, 2015, 2 pages.

Bugnion, E. et al., "Compiler-directed page coloring for multiprocessors", Proceedings of the Seventh International Conference on Architectural Support for Programming Languages and Operating Systems (ASPLOS VII), ACM, Oct. 1996, 12 pages.

Chen, X. et al., "Overshadow: A Virtualization-Based Approach to Retrofitting Protection in Commodity Operating Systems", Proceedings of the Thirteenth International Conference on Architectural Support for Programming Languages and Operating Systems (ASPLOS '08), ACM, Mar. 1-5, 2008, pp. 2-13.

Chen, X., et al., "Operating System Controlled Processor-Memory Bus Encryption", in Proceedings of Design, Automation and Test in Europe, 2008, (Date'08), IEEE, pp. 1154-1159, 6 pages.

(56) References Cited

OTHER PUBLICATIONS

Iyer, Ravi, "COoS: A Framework for Enabling OoS in Shared Caches of CMP Platforms," in Proceedings of the 18th Annual International Conference on Supercomputing (ICS '04), ACM, Jun. 26-Jul. 1, 2004, pp. 257-266.

McKeen, F., et al., "Innovative Instructions and Software Model for Isolated Execution", Proceedings of the Second International Workshop on Hardware and Architectural Support for Security and Privacy (HASP '13), ACM, Jun. 2013, pp. 1-8.

Muller, T. et al., "TRESOR Runs Encryption Securely Outside RAM", in Proceedings of the 20th USENIX Security Symposium [retrieved Nov. 12, 2015] Retrieved from the Internet: <http://www.usenix.org/events/sec11/tech/full_papers/muller.pdf>, Aug. 2011, pp. 1-16.

Peterson, Peter a.H., "Cryptkeeper: Improving Security with Encrypted RAM", in IEEE International Conference on Technologies for Homeland Security (HST 2010), Nov. 2010, pp. 1-7.

Ports, Dan R.K. et al., "Towards application security on untrusted operating systems", Proceedings of the Third Conference on Hot Topics in Security (HOTSEC '08), Jul. 2008, 7 pages.

Rosenblum, M., et al., "Using the SimOS machine simulator to study complex computer systems", ACM Transactions on Modeling and Computer Simulation, vol. 7, Issue 1, Jan. 1997, pp. 78-103, 26 pages.

Vasudevan, A., et al. "CARMA: A Hardware Tamper-Resistant Isolated Execution Environment on Commodity x86 Platforms", in Proceedings of the ACM Symposium on Information,Computer and Communications Security (ASIACCS 2012), May 2012, 5 pages.

Zhang, X. et al. 2009, "Towards practical page coloring-based multicore cache management", Proceedings of the 4th ACM European Conference on Computer Systems (EuroSys '09), ACM, Apr. 1-3, 2009, pp. 89-102, 14 pages.

Advisory Action mailed Aug. 19, 2014, for U.S. Appl. No. 13/614,935 of Horovitz, O. et al., filed Sep. 13, 2015, 3 0f 27 pages.

Extended European Search Report mailed Aug. 5, 2015, for European Patent Application No. 12831564.5, 7 pages.

Final Office Action mailed Jun. 5, 2014, for U.S. Appl. No. 13/614,935 of Horovitz, O., filed Sep. 13, 2012, 24 pages.

International Search Report and Written Opinion of International Application No. PCT/US12/55210, Jan. 25, 2013, 9 pages.

Non-Final Office Action mailed Feb. 19, 2015, for U.S. Appl. No. 13/614,935 of Horovitz, O., filed Sep. 13, 2012, 26 pages.

Non-Final Office Action mailed Nov. 18, 2013, for U.S. Appl. No. 13/614,935 of Horovitz, O., filed Sep. 13, 2012, 25 pages.

Notice of Allowance mailed Jul. 15, 2015, for U.S. Appl. No. 13/614,935 of Horovitz, O., filed Sep. 13, 2012, 13 pages.

Restriction Requirement mailed Aug. 27, 2013, for U.S. Appl. No. 13/614,935 of Horovitz, O., filed Sep. 13, 2012, 5 pages.

* cited by examiner

SYSTEM AND METHOD FOR PARTITIONING OF MEMORY UNITS INTO NON-CONFLICTING SETS

CROSS-REFERENCE TO RELATED APPLICATIONS

This application claims priority of U.S. Provisional Patent Application No. 61/874,350, filed 5 Sep. 2013.

FIELD OF THE INVENTION

This invention relates to the partitioning of computer memory, in particular within a processor cache.

BACKGROUND

Caching is a well-known technique for improving computer performance and different types of caches are found in almost every modern computer. A processor, that is, CPU cache is usually a relatively small but fast hardware memory structure in which copies of frequently needed information (instructions and data) are stored so as to be more readily accessible. Traditionally, computer processors have employed a simple mapping from physical memory addresses to processor cache sets, in which the low-order bits of the physical page number are used as the high-order bits of the cache set index. The term "page" generally refers to a contiguous, aligned region of memory, and is typically used as a unit for address translation and memory management. For example, systems having the x86 architecture commonly use 4 KB pages.

A hardware "cache set" contains space for caching a limited number of memory units, typically referred to as cache "lines". For example, on modern x86 hardware, the cache line granularity is 64 bytes, with 64-byte alignment. On the Intel Sandy Bridge x86 processor, a single last-level cache set consists of 20 lines; i.e., the cache is 20-way set associative.

The traditional, straightforward hardware mapping of physical pages to cache sets has been leveraged for many years by operating systems and hypervisors, using a well-known technique known as "page coloring". Pages are partitioned into disjoint sets called "colors", such that pages with different colors do not conflict in the cache. A page's color can be computed trivially from its physical address, for example, using a simple shift-and-mask technique. Page coloring has been used in many systems to improve performance by reducing cache conflict misses and to control the isolation or sharing of cache memory between software contexts.

However, some recent processors, such as those based on the Intel Sandy Bridge (SNB) and Ivy Bridge (IVB) x86 micro-architectures, now use "complex cache indexing" to map physical addresses to cache sets in the processor's last level cache (LLC). The hardware that realizes this mapping can be implemented using an arbitrarily complicated, undocumented, proprietary hash function that may potentially use any of the bits in the physical memory address to index into the cache. As a result, small contiguous memory regions may be scattered across many discontiguous sets throughout the cache, and traditional page coloring techniques may no longer work. The mapping function may also vary across different processor implementations or configurations, even within the same processor family.

It would therefore be advantageous to have an automated software-based approach that can partition memory units (such as pages or lines) into sets, such that units in different sets do not contend for the same limited space within the processor cache. Preferably, this method should work even for processors that employ opaque complex cache indexing to map physical addresses to their corresponding cache sets. Such a capability would enable software, including operating systems and hypervisors, to manage or eliminate cache conflict misses by consulting this partitioning when making memory management decisions, enjoying benefits similar to traditional page coloring. This capability is especially useful in the context of a software cryptoprocessor system, such as the vCage system provided by PrivateCore, Inc., in which the ability to control cache residency and prevent evictions helps maintain confidentiality and integrity.

DETAILED DESCRIPTION

Figure 1:
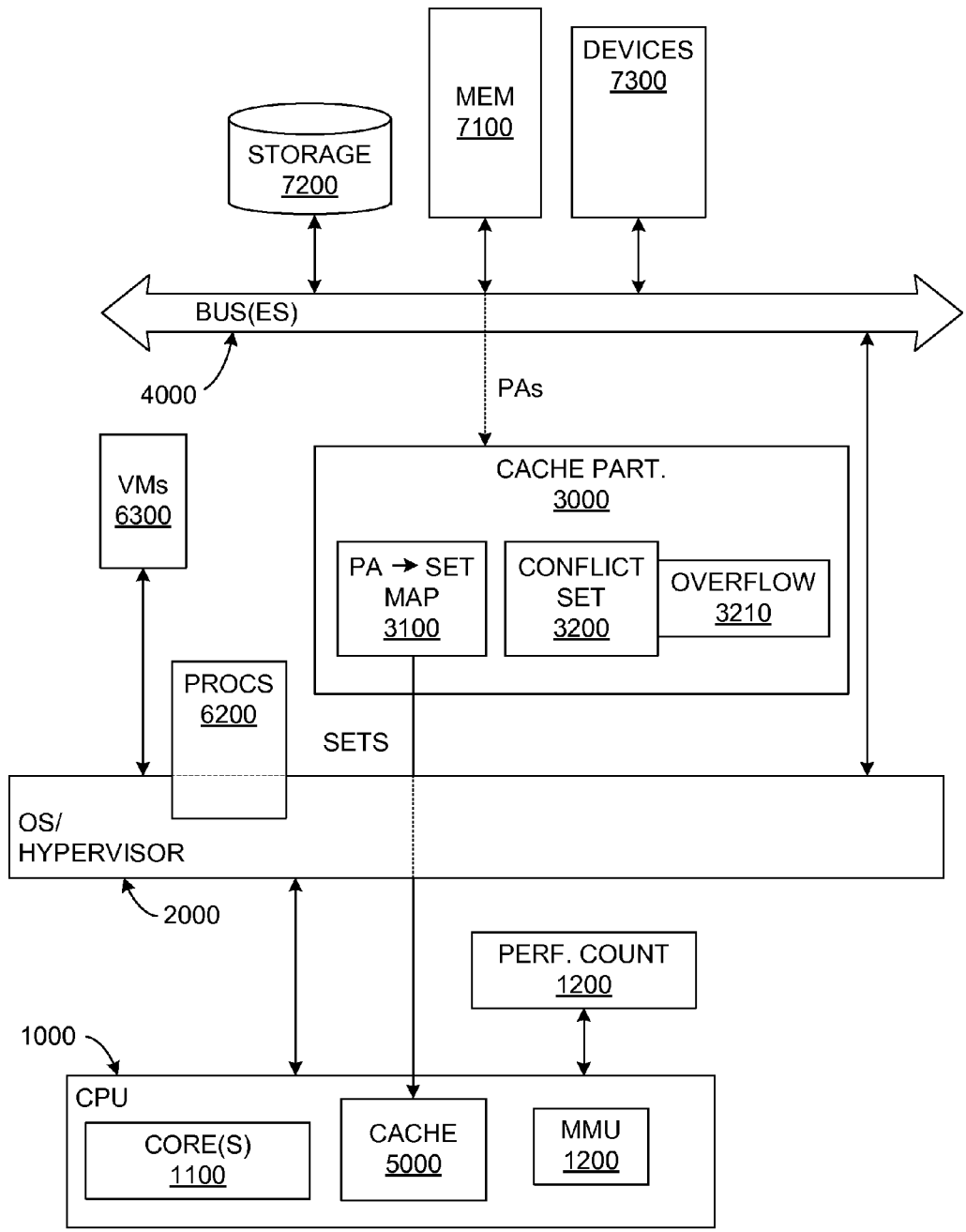
FIG. 1 illustrates the main components of a system that enables detection of cache conflicts and efficient partitioning of selected memory addresses into non-conflicting cache sets.

FIG. 1 is a simplified illustration of a computer system that could embody different aspects of the invention. At the heart of the system is a main processor CPU 1000, which includes at least one core 1100 that fetches and processes instructions using well-known components and circuitry, such a memory management unit MMU 1200. A CPU will of course include many different additional components, ranging from internal clock circuitry to an ALU, but since these are so well-known, they are not illustrated even though they may be assumed to be part of the CPU 1000.

System-level software such as an operating system (OS) and/or hypervisor 2000 will typically be included to perform well-known functions. Various system- and user-level processes 6200 run under the supervision of the OS/hypervisor 2000. In some systems, virtual machines (VMs) 6300, which can be considered a special type of processes, also run on the system software. A hypervisor will typically not be necessary if no virtual machines are included; both options are illustrated in FIG. 1 merely for the sake of completeness. Various devices 7300, which can encompass almost any known devices such as storage, network, human interface, a chipset, etc., may also be included. Some form of non-volatile storage 7200 such as a hard disk system will normally be included along with typically less persistent but faster memory devices such as system memory 7100.

In FIG. 1, the system memory 7100 is shown as a single component MEM, but this is merely for the sake of clarity; in most implementations, the system memory 7100 will comprise different high-speed memory devices that may be included either stand-alone, such as for the main system memory, dedicated and located within different devices, etc. RAM, flash memory, flash-backed RAM, and other such technologies may also be encompassed by the general term "system memory 7000". From the perspective of the CPU, the system memory 7100 is therefore some addressable memory space, which does not need to be within one component or contiguous. A typical computer system will also include various buses 4000 such as an address bus, a data bus, possibly a dedicated I/O bus, etc. In cases where one or more devices is remote, there will generally also be some form of network channel, bus, or point-to-point interconnects, which are not separately shown merely for the sake of simplicity.

Of particular interest in the context of this invention is the cache 5000, which is part of the CPU 1000. Some systems use a multi-level cache. In a two-level (L1, L2) cache, the L1 cache is typically faster but smaller and is ordinarily included within the processor itself. The L2 cache will generally be larger but slower than the L1 cache and may come between the L1 cache and system memory. Multi-level cache systems generally operate by checking the L1 cache first; if it hits, the processor proceeds at high speed. If the smaller L1 cache misses, L2 is checked, and so on, before external memory is checked. Some systems have additional cache levels, and still others have separate L1 caches for instructions and data. The general structure and properties of a cache are well-understood in the field of computer science and will therefore not be described further here, except to the extent needed or helpful to understand the different embodiments.

A cache partitioning software module (the "cache partitioner") 3000 is included either at the application level, as shown in FIG. 1, or as part of the system software layer. As with other software, the cache partitioner comprises a body of processor-executable code that will normally be embodied in a non-volatile, non-transitory storage medium before being loaded into memory for execution to perform the various functions described below.

According to various embodiments, the cache partitioner partitions memory units into non-conflicting sets at cache-line granularity, and executes on the processor 1000 to discover its address-to-set mapping dynamically. No up-front knowledge of the processor cache organization is required; however, if partial information or constraints regarding the mapping happen to be known, they can be leveraged to accelerate the process. In one embodiment, each line within a specified physical memory region may be partitioned into disjoint sets, so that addresses in different sets do not conflict in the Last Level Cache (LLC), for example, the L1 cache 5000.

A collection of physical addresses (PAs) forms an input to the cache partitioner at cache-line granularity, for example, 64-byte alignment on x86 hardware. In one embodiment, the input addresses may be specified conveniently as a single contiguous address range, but this is not required; the input may consist of multiple ranges, or even an arbitrary collection of individual line addresses. The selection of such "test" input addresses may be made by a user, for example, to test some known range so as to increase performance, or automatically; for example, the OS could designate the addresses containing all or some portion of performance-critical code for cache partitioning and optimization before the code needs to be executed, possibly repeatedly. As output, a mapping module 3100 within the cache partitioner maps each cache-line-sized input address to its corresponding cache set. This generates a partitioning of the input addresses, such that addresses identified as belonging to the same partition conflict in the cache, and addresses in different partitions do not conflict in the cache.

Figure 2:
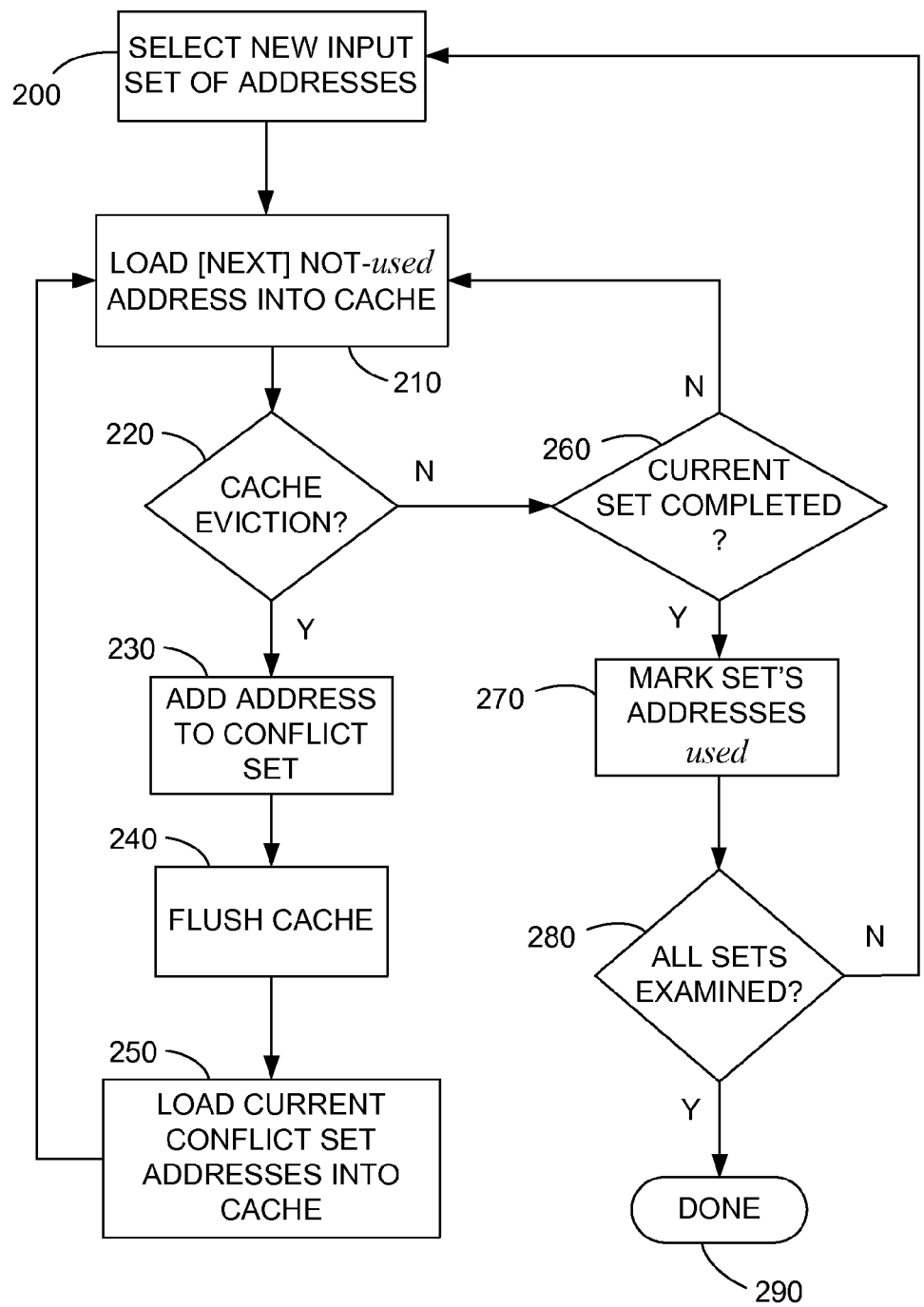
FIG. 2 is a flowchart that illustrates the main processing steps of one memory-partitioning embodiment.

The method exploits the limited associativity of a single cache set to force observable cache evictions and discover conflicts. FIG. 2 illustrates the main processing steps for one embodiment: As a summary, the input set of memory addresses is selected (200). Loads of the input memory addresses to the cache are issued (210), one at a time, until a cache eviction is detected (220) while accessing some address, for example, by observing a change in hardware performance monitoring counters 1200. After observing a cache eviction on a load from an address, that address is added to a data structure 3200 representing the current conflict set (230). The cache is then flushed (240), and loads are issued to all addresses in the current conflict set (250), so that all known-conflicting addresses are accessed first, ensuring that the next cache miss will occur on a different conflicting address. The process is repeated (260), issuing loads from all input memory addresses, incrementally finding conflicting addresses, one by one, until all addresses in the selected set have been identified (290).

By computing a single conflict set, the hardware cache set associativity is forcibly exceeded, which allows the cache partitioner to identify conflicting addresses by monitoring cache evictions. The degree of cache associativity may be known a priori; for example, the Intel Sandy Bridge x86 processor LLC is known to have 20-way set associativity; this information is well-documented. Associativity may in other cases be determined by querying the processor directly, for example, via the x86 CPUID instruction.

The subset of input memory addresses which may potentially conflict is first identified (FIG. 2, step 200). Without any initial information about the address-to-set mapping function, all input lines may be considered to be potentially conflicting. Optionally, if additional information is available, it can be used to limit this subset. For example, empirical observations with the Intel Sandy Bridge x86 processor revealed that the low-order 17 bits of each address were identical within a set of conflicting addresses. An optimized version of one embodiment exploited this information to reduce the size of the search space, resulting in more than 100× speedup. In some cases, it may be possible to infer such information dynamically and perform runtime optimizations.

The conflict set 3200 may initially be set empty, but entries are then stored in it so as to maintain an array of addresses known to conflict in the cache 5000. After flushing the entire cache (for example, using the x86 WBINVD instruction), lines within the set of potentially-conflicting input addresses are accessed one-by-one, until a hardware cache performance counter 1200 programmed to monitor evictions, checked after each access, detects that a first eviction has occurred. As just one example, on the Intel Sandy Bridge x86 processor, one prototype programmed the uncore CBO performance counters to monitor the LLC_VICTIMS event filtered by the MES cache states.

As described above, each address that leads to a cache eviction is added to the conflict set 3200. The cache 5000 is again flushed, and reads are performed to all addresses in the current conflict set in order to ensure that they are resident in the cache. As a result, a different conflicting input address associated with the same set will cause the next eviction. In essence, this process rotates through a ring of conflicting lines that exceed the hardware cache associativity. The entire set of potentially conflicting addresses is again read one-by-one, in the same order, and the address causing the next eviction is added to the conflict set. This process is repeated until all addresses in the set have been identified.

Note that each partition generated by this procedure will contain N+1 physical lines for an N-way set-associative cache. For example, one prototype generated partitions containing 21 physical line addresses for the 20-way set-associative Intel Sandy Bridge LLC. This also provides an alternative mechanism that can be used for computing associativity dynamically.

For large collections of input addresses, such as a region that exceeds the LLC size significantly (for example, a 100

MB region on Intel Sandy Bridge), each partition may contain more than N+1 physical lines. Various approaches can then be used to identify the remaining input memory addresses that belong to the same conflict set. For example, to find the $(N+2)^{nd}$ conflicting line, the cache partitioner may select any address A from among the N+1 addresses in the existing conflict set, and add it to an auxiliary "overflow" data structure 3210 associated with the conflict set 3200. The system may then remove A from the existing conflict set, so that it contains only N addresses, and also remove A from the set of input memory addresses. The conflict-set identification procedure is then continued, as before. The next address added to the conflict set will be the $(N+2)^{nd}$ conflicting address—counting (N+1) addresses in the current conflict set 3200, plus one address in the auxiliary overflow set 3210. This process can be repeated until all input memory addresses have been associated with partitions, with each partition consisting of the addresses in the conflict set together with its associated overflow conflict set.

After each conflict set is identified, meta-data associated with each of its constituent line addresses may be updated to mark them (FIG. 2, 270) as already "used" by some set. When lines in the set of potentially-conflicting input addresses are read one-by-one in the procedure outlined above, any which have already been marked used may instead be flushed from the cache (for example, using the x86 CLFLUSH instruction), thereby preventing noise due to pre-fetching or eviction events from other sets. In other words, once a first conflict occurs and is detected, the system may follow the procedure outlined to change the order in which the conflicting lines are accessed—essentially rotating through them—until all conflicts in the set are identified. Once the first set is complete—either because the maximum associativity is known, or because the new misses occur only on lines already identified as belonging to the current set—then they may be marked in metadata as used, effectively removing them from the input set, and a new set may be tested (FIG. 2, 280). (Even more strongly, the system could explicitly remove them from the cache via CLFLUSH, in order to explicitly prevent noise due to pre-fetches, etc). The result is a very robust overall procedure.

In some processors, the effective associativity of each cache set may vary across different sets. For example, using one prototype, the inventors discovered that some cache sets on the Intel Sandy Bridge LLC appeared to have only 19-way set associativity, instead of the expected 20 ways. One possible explanation for this is that it may have been due to way-partitioning performed in hardware. Some hardware units, such as the SNB integrated graphics controller, are allowed to claim a dedicated portion of the cache for their exclusive use, implemented in hardware by reserving one way of associativity from each of many cache sets. As a result, this portion of the cache is not available for use by software. The cache-set identification procedure disclosed here still computes effective set associativity information accurately in such a case. Such information is especially valuable for processors, moreover, that may employ "way partitioning" to dedicate portions of the cache for use by hardware or software to support cache quality-of-service (CQoS) features.

Optionally, the robustness and accuracy of the method described above can be further improved by reducing other sources of potential noise in the system that may generate uncontrolled cache evictions. Preferentially, the system may be booted as a uniprocessor, in order to prevent memory accesses from other processor cores sharing the LLC. Note that this is not a limitation, however, but rather an optimization—one prototype was still able to generate conflict sets successfully when the system was booted as a multiprocessor.

Similarly, it will typically be advantageous to disable interrupts while a single conflict set is being computed. On some systems, system management interrupts cannot be disabled, but can be counted; if any occurred while computing a conflict set, the computation can be repeated.

To prevent the measurement process itself from causing unwanted evictions that could affect partitioning accuracy, the code and data associated with the conflict-set computation may be mapped uncached. The system's primary data structures may then be allocated in uncached memory for this reason. Alternatively, the addresses used for this code and data can be changed dynamically, for example by maintaining multiple copies, and switching between them to prevent persistent conflicts.

More generally, the entire conflict-set computation can be repeated multiple times to ensure consistent results. Any sets that are not identical across runs, due possibly to transient effects such as uncontrolled cache evictions, can then be recomputed. In practice, the inventors have observed very few differences between the partitions generated separately by different runs; for example, it was observed that there was only a single-line difference in less than 0.2% of the partitions computed for a 20 MB cache-sized region, even without using several of the noise-reduction techniques described above.

The conflict-set computation is sufficiently performant to generate partitions dynamically at runtime for many purposes. However, for current processors, the procedure typically needs to be run only once per processor model and stepping, since the address-to-set mapping is static and identical for all instances of the same hardware.

As described above, one embodiment relies on a hardware performance counter 1200 to detect cache evictions, while accessing each line within the set of potentially-conflicting input addresses, one-by-one. While recent Intel x86 processors provide hardware counters that can be configured to count evictions, some other processors may lack this capability. In such cases, alternative implementation techniques can be used to detect evictions. Nearly all modern processors provide a hardware performance counter that can be configured to count cache misses. A cache miss counter can thus be leveraged to count evictions, since an access to a line that has been evicted will generate a miss. To determine if a cache eviction has occurred as the result of accessing a particular input address A, all input addresses accessed prior to A are re-accessed, one-by-one, in the same order, checking the hardware cache miss counter after each access. If a miss is detected, then the access to A caused an eviction. A similar method can be used on a processor that lacks even a cache miss counter, by instead timing each access (for example using the x86 RDTSC instruction); the latency of a cache miss is typically one or two order of magnitude slower than a cache hit. However, note that these alternative techniques are less efficient than using an explicit eviction counter, and may need to be repeated more times to ensure consistent results.

The method described above partitions memory units into non-conflicting sets at cache-line granularity (for example 64 bytes on x86 processors), revealing the details of how the hardware maps physical memory addresses to processor cache sets. This fine-grained information can be used directly to determine if larger memory units can conflict in the cache, by checking if any of their constituent lines can conflict. For example, since pages (for example 4 KB on x86 processors) are typically used as the unit for address translation and memory management by both processor hardware and system software, it is valuable to partition pages into non-conflicting sets.

For example, one prototype implementation for the Intel Sandy Bridge (SNB) x86 processor displayed facts about its LLC organization that could be leveraged by system software to perform page-level partitioning: A 20 MB SNB LLC contains 320K 64-byte lines. These lines are grouped into 16K 20-way-associative cache sets. SNB LLC sets are partitioned across eight hardware cache "slices", such that each slice contains 2K sets. This means that an intra-slice cache set index can be represented in 11 bits. As noted above, the SNB LLC conflict-set data revealed that the low-order 17 address bits are identical within a single conflict set. These 17 bits encode an 11-bit intra-slice cache index (bits 6 . . . 16), plus a 6-bit intra-line byte offset (bits 0 . . . 5). This means that at 4 KB-page granularity, there will be 32 cache partitions based on address bits 12 . . . 16 (bits 0 . . . 11 are the intra-page byte offset), each with size 640 KB. This information alone yields a mechanism for performing coarse cache partitioning.

While the intra-slice cache index can be extracted directly from a physical address, each slice has a cache set at that index. The SNB LLC conflict-set data also revealed patterns in the hardware address-to-slice mapping. Note that two pages won't conflict in the cache if their constituent lines are mapped to different slices; i.e., for all lines L=0 . . . 63, L is mapped to different slices in each page. Observing one prototype, it was noted that that consecutive lines within a page were striped across different slices in one of eight regular patterns. Such information yields a second partitioning method that is distinct from traditional page coloring, based on classifying each page into one of eight slice patterns. Pages with different slice patterns do not conflict in the cache, but the slice number is not encoded as a simple bit range in the physical address.

More generally, by computing conflict sets for many regions, and examining the observed patterns, it is possible to infer or at least gain some insight into the hash function used by the hardware, which enables a more compact representation compared with using a simple lookup table that encodes the raw conflict-set data for a region. This inference may be performed manually, or by using an automated approach, such as one based on machine learning algorithms.

Using both methods of SNB cache partitioning derived from the conflict-set data, it is in many cases also possible to construct "2D" nested partitions—one using address ranges, where address bits 12 . . . 16 encode the "page color", and the other using the page's slice-pattern classification. Note that this classification can be stored compactly, consuming only three bits per 4K page using a simple lookup table. Assuming the two partitioning methods are orthogonal, each 640 KB page-color partition can be sub-partitioned into eight slice patterns, thereby yielding a smaller, more flexible 80 KB partitioning granularity.

In many implementations, the method and system described above for partitioning memory units into non-conflicting sets will be done statically, especially if the time to complete the process is anticipated to take too long for run-time partitioning to be feasible. Nonetheless, the invention is not limited to static operation: By identifying other invariants (like a low-order 17 bits-identical property mentioned above) automatically at runtime, the system may be able to speed up its performance enough to enable dynamic, run-time partitioning of memory into non-conflicting sets.

Another example of a potentially exploitable invariance might be if the target processor's cache indexing function changes only during processor initialization (for example at boot-time) and the associated indexing function is a static mapping, for example, such that a single address could not be mapped to different locations in the cache.

In some cases involving more dynamic cache indexing functions, the method described above could be combined with specific access patterns, including repeated access to some lines, in order to reveal information about the dynamic function. For example, suppose the cache indexing function can map a single address to one of two sets in the cache based on the dynamic contention for each set. By manipulating the order and number of accesses to memory addresses, an extended method could generate different levels of contention in an artificial, controlled manner, in order to identify both possible cache sets associated with each memory address.

The method described above efficiently partitions memory units into non-conflicting sets. It would also be possible, however, to use the method, for purely analytical purposes, even on a single set of memory units. For example, as mentioned above, the information that embodiments compile might be used to detect cache associativity characteristics.

In the description above, it is physical memory addresses that are processed to create efficient partitioning. It would also be possible to apply the various processing steps to virtual addresses as well, or instead, of physical addresses, assuming the mapping of virtual to physical addresses remains unchanged.

Any of the steps, operations, or processes described herein may be performed or implemented with one or more hardware or software modules, alone or in combination with other devices. In various embodiments, the cache partitioner 3000 is a software module implemented with a computer program product comprising a computer-readable medium containing computer program code, which can be executed by the CPU 1000 for performing any or all of the steps, operations, or processes described. It would in some cases also be possible to implement one or more of the embodiments using an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus.

The invention claimed is:

1. A method for managing memory in a computer comprising, for each of at least one input set of memory addresses, and iteratively for each of the memory addresses in the at least one input set:
   a) loading a current memory address, belonging to the at least one input set, into a processor cache;
   b) detecting whether an eviction occurs from the cache as a result of the loading of current memory address into the processor cache;
   c) if an eviction is detected:
      i) adding the current memory address to a conflict set of memory addresses;
      ii) flushing the cache; and
      iii) loading the conflict set into the cache;
   d) if no eviction is detected, determining whether all of the input set of memory addresses has been loaded into the cache and, if not, loading a next one of the input set of memory addresses into a processor cache;

whereby the input set of memory addresses is determined to be partitioned into a plurality of partitions such that memory addresses that conflict in the cache belong to the same partition, whereas memory addresses belonging to different partitions do not conflict in the cache.

2. The method of claim 1, further comprising repeating the operations a)-d) of claim 1 for each of a plurality of input sets.

3. The method of claim 2, further comprising:
marking memory addresses in the current set as being used after they have been loaded; and
loading as current memory addresses of subsequent input sets only memory addresses not marked as used.

4. The method of claim 1, further comprising detecting whether an eviction occurs by detecting a change in a hardware performance counter.

5. The method of claim 1, further comprising:
configuring a hardware performance counter to count cache misses;
detecting whether an eviction occurs as a result of accessing a newly loaded memory address by reloading into the cache, one by one and in order, previously loaded memory addresses, examining the hardware performance counter after each reloading, and determining the eviction as being the result of loading the newly loaded memory address if the hardware performance counter indicates a cache miss upon loading of the newly loaded memory address.

6. The method of claim 1, further comprising detecting whether an eviction occurs as a function of access latency for each respective current memory address.

7. The method as in claim 1, in which the partitions have a cache-line granularity.

8. A system for managing memory in a computer comprising:
a processor;
a processor cache;
a cache partitioning module being configured, for each of at least one input set of memory addresses, and iteratively for each of the memory addresses in the at least one input set, for:
a) loading a current memory address, belonging to the at least one input set, into a processor cache;
b) detecting whether an eviction occurs from the cache as a result of the loading of current memory address into the processor cache;
c) if an eviction is detected:
i) adding the current memory address to a conflict set of memory addresses;
ii) flushing the cache; and
iii) loading the conflict set into the cache;
d) if no eviction is detected, determining whether all of the input set of memory addresses has been loaded into the cache and, if not, loading a next one of the input set of memory addresses into a processor cache;
whereby the input set of memory addresses is determined to be partitioned into a plurality of partitions such that memory addresses that conflict in the cache belong to the same partition, whereas memory addresses belonging to different partitions do not conflict in the cache.

9. The system of claim 8, in which the cache partitioning module is configured to repeat the operations a)-d) of claim 8 for each of a plurality of input sets.

10. The system of claim 9, in which the cache partitioning module is further configured:
for marking memory addresses in the current set as being used after they have been loaded; and
for loading as current memory addresses of subsequent input sets only memory addresses not marked as used.

11. The system as in claim 8, further comprising a hardware performance counter, said cache partitioning module being configured for detecting whether an eviction occurs by detecting a change in the hardware performance counter.

12. The system of claim 8, further comprising:
a hardware cache miss counter;
said cache partitioning module being configured for detecting whether an eviction occurs as a result of accessing a newly loaded memory address by reloading into the cache, one by one and in order, previously loaded memory addresses, examining the hardware cache miss counter after each reloading, and determining the eviction as being the result of loading the newly loaded memory address if the hardware cache miss counter indicates a cache miss upon loading of the newly loaded memory address.

13. The system of claim 8, in which the cache partitioning module is configured for detecting whether an eviction occurs as a function of access latency for each respective current memory address.

14. A non-transitory computer-readable storage medium storing instructions, the instructions, when executed by a processor, causing the processor:
for each of at least one input set of memory addresses, and iteratively for each of the memory addresses in the at least one input set:
a) to load a current memory address, belonging to the at least one input set, into a processor cache;
b) to detect whether an eviction occurs from the cache as a result of the loading of current memory address into the processor cache;
c) if an eviction is detected:
i) to add the current memory address to a conflict set of memory addresses;
ii) to flush the cache; and
iii) to load the conflict set into the cache; and
d) if no eviction is detected, to determine whether all of the input set of memory addresses has been loaded into the cache and, if not, to load a next one of the input set of memory addresses into a processor cache;
whereby the input set of memory addresses is determined to be partitioned into a plurality of partitions such that memory addresses that conflict in the cache belong to the same partition, whereas memory addresses belonging to different partitions do not conflict in the cache.

15. The medium of claim 14, said instructions, upon execution by the processor, further causing the processor to repeat the operations a)-d) of claim 14 for each of a plurality of input sets.

16. The medium of claim 15, said instructions, upon execution by the processor, further causing the processor:
to mark memory addresses in the current set as being used after they have been loaded; and
to load as current memory addresses of subsequent input sets only memory addresses not marked as used.

17. The medium of claim 14, said instructions, upon execution by the processor, further causing the processor to detect whether an eviction occurs by detecting a change in a hardware performance counter.

18. The medium of claim 14, in which the instructions, upon execution by the processor, further cause the processor:

to configure a hardware performance counter to count cache misses; and to detect whether an eviction occurs as a result of accessing a newly loaded memory address by reloading into the cache, one by one and in order, previously loaded memory addresses, examining the hardware performance counter after each reloading, and determining the eviction as being the result of loading the newly loaded memory address if the hardware performance counter indicates a cache miss upon loading of the newly loaded memory address.

19. The medium of claim 14, in which the instructions, upon execution by the processor, further cause the processor to detect whether an eviction occurs as a function of access latency for each respective current memory address.

20. The medium of claim 14, in which the partitions have a cache-line granularity.

21. A computer program product having a non-transitory computer-readable storage medium storing computer-executable code, the code comprising a cache partitioning module configured, for each of at least one input set of memory addresses, and iteratively for each of the memory addresses in the at least one input set:
   a) to load a current memory address, belonging to the at least one input set, into a processor cache;
   b) to detect whether an eviction occurs from the cache as a result of the loading of current memory address into the processor cache;
   c) if an eviction is detected:
      i) to add the current memory address to a conflict set of memory addresses;
      ii) to flush the cache; and
      iii) to load the conflict set into the cache; and
   d) if no eviction is detected, to determine whether all of the input set of memory addresses has been loaded into the cache and, if not, to load a next one of the input set of memory addresses into a processor cache;
   whereby the input set of memory addresses is determined to be partitioned into a plurality of partitions such that memory addresses that conflict in the cache belong to the same partition, whereas memory addresses belonging to different partitions do not conflict in the cache.

22. The computer program product of claim 21, in which the cache partitioning module is further configured to repeat the operations a)-d) of claim 21 for each of a plurality of input sets.

23. The computer program product of claim 22, in which the cache partitioning module is further configured:
   to mark memory addresses in the current set as being used after they have been loaded; and
   to load as current memory addresses of subsequent input sets only memory addresses not marked as used.

24. The computer program product of claim 21, in which the cache partitioning module is further configured to detect whether an eviction occurs by detecting a change in a hardware performance counter.

25. The computer program product of claim 21, in which the cache partitioning module is further configured to:
   to configure a hardware performance counter to count cache misses; and
   to detect whether an eviction occurs as a result of accessing a newly loaded memory address by reloading into the cache, one by one and in order, previously loaded memory addresses, examining the hardware performance counter after each reloading, and determining the eviction as being the result of loading the newly loaded memory address if the hardware performance counter indicates a cache miss upon loading of the newly loaded memory address.

26. The computer program product of claim 21, in which the cache partitioning module is further configured to detect whether an eviction occurs as a function of access latency for each respective current memory address.

27. The computer program product of claim 21, in which the partitions have a cache-line granularity.

* * * * *